United States Patent [19]

Johnson et al.

[11] Patent Number: 4,814,884

[45] Date of Patent: Mar. 21, 1989

[54] WINDOW GENERATOR

[75] Inventors: William K. Johnson, Ft. Collins, Colo.; Roger A. May, Winter Park, Fla.

[73] Assignee: The United States of America as represented by the Secretary of the Air Force, Washington, D.C.

[21] Appl. No.: 110,918

[22] Filed: Oct. 21, 1987

[51] Int. Cl.[4] .............................................. H04N 5/272

[52] U.S. Cl. .................................... 358/183; 340/747; 340/799; 340/724

[58] Field of Search ........................ 358/167, 160, 183; 364/521; 340/724, 747, 798, 799

[56] References Cited

U.S. PATENT DOCUMENTS

| | | | |
|---|---|---|---|
| 3,540,012 | 11/1970 | Ehrman | 340/724 X |
| 4,096,525 | 6/1978 | Lathan | 358/107 |
| 4,115,806 | 9/1978 | Morton | 358/107 |
| 4,334,241 | 6/1982 | Kashioka et al. | 358/107 |
| 4,400,728 | 8/1983 | Long | 358/107 |
| 4,425,559 | 1/1984 | Sherman | 340/747 |
| 4,449,144 | 5/1984 | Suzuki | 358/105 |
| 4,491,836 | 1/1985 | Collmeyer et al. | 340/747 |
| 4,496,944 | 1/1985 | Collmeyer et al. | 340/747 X |
| 4,497,066 | 1/1985 | Gasparri, Jr. | 382/48 |
| 4,498,778 | 2/1985 | White | 356/376 |
| 4,570,181 | 2/1986 | Yamamura | 358/160 |
| 4,602,251 | 7/1986 | Sawada et al. | 340/799 X |
| 4,618,858 | 10/1986 | Belch | 340/724 |
| 4,646,078 | 2/1987 | Knierim et al. | 340/747 X |
| 4,679,086 | 7/1987 | May | 358/167 |
| 4,694,288 | 9/1987 | Harada | 340/747 X |
| 4,706,074 | 11/1987 | Muhich et al. | 340/799 X |
| 4,710,761 | 12/1987 | Kapur et al. | 340/799 X |
| 4,728,945 | 3/1988 | Kojima | 340/724 X |

FOREIGN PATENT DOCUMENTS

| | | | |
|---|---|---|---|
| WO85/02049 | 5/1985 | PCT Int'l Appl. | 340/724 |
| 2154837 | 9/1985 | United Kingdom | 340/724 |

OTHER PUBLICATIONS

Geoff Bristow, "Single-Chip Controller for Colour Graphics Systems", Electronic Product Design, Sep. 1980, pp. 50–53.

*Primary Examiner*—James J. Groody
*Assistant Examiner*—E. Anne Faris
*Attorney, Agent, or Firm*—William G. Auton; Donald J. Singer

[57] ABSTRACT

A window generator is disclosed which provides a unique 6 bit target identification number for up to 63 target areas and one background area in a frame of serially scanned data. Any number of target areas can be identified by increasing memory width. The target numbers allow video pipeline processing circuitry to collect statistics separately for each target area. A target number is provided for each pixel as the image is scanned in a raster can format. The target areas are defined as rectangular sectors with background at all other non-target locations. The window generator has contained in a RAM the data necessary to define the window areas. This data is calculated and formatted off-line by a microprocessor and downloaded into the RAM. Information contained in the RAM represents the number of pixels between any two successive target area corners along with a two bit command word.

5 Claims, 4 Drawing Sheets

WINDOW GENERATOR

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in U.S. patent application Ser. No. 831,894, filed 24 Feb. 1986 entitled "Motion Sensitive Frame Integration" by Roger A. May, the disclosure of which is incorporated herein by reference.

BACKGROUND OF THE INVENTION

The present invention relates generally to video target recognition systems and more specifically to a window generator which receives a field of video data and applies an identification code to rectangular subregions to identify distinct target areas within a given background area.

Video data acquisition systems typically store received video images in a computer memory, as well as present them on a display. The total image is digitally stored in terms of horizontal projection counts of the image pixels, and vertical projection counts of the image lines. Once acquired, the digital data can be used to calculate the location and orientation of targets within the video image data field.

The procedure of calculating target locations from within the entire image data field can be a time consuming process. The task of reducing the time of determining a location of targets within a two-dimensional video image is alleviated, to some extent, by the systems of the following U.S. patents, the disclosures of which are incorporated herein by reference:

U.S. Pat. No. 4,497,066, issued to A. Gasparri, Jr.;
U.S. Pat. No. 4,400,728, issued to D. Long;
U.S. Pat. No. 4,498,778, issued to S. White;
U.S. Pat. No. 4,096,525, issued to W. Lanthan;
U.S. Pat. No. 4,334,241, issued to S. Kashioka et al;
U.S. Pat. No. 4,115,806, issued to R. Morton; and
U.S. Pat. No. 4,449,144, issued to M. Suzuki.

The above-cited references all disclose video signal systems which sense the location of targets. Of particular note are the Gasparri, Long, and White references. The Gasparri reference discloses a video data acquisition system which digitizes picture images of an article and selects signals within a predetermined amplitude range as representations of pixels of the picture image. The Long reference discloses a video process control system for identifying, inspecting, or measuring machined parts or the like in which each part is placed in the viewing field of a video camera. The White reference discloses an apparatus for determining the spatial coordinates of a workpiece within the field of view of the apparatus.

The above-cited references indicate the presence of a need to provide an identification and location of targets within a field of video image data on a real time basis. The present invention is intended to satisfy that need.

SUMMARY OF THE INVENTION

The present invention comprises a window generator which provides a unique 6 bit target identification number for up to 63 target areas and one background area in a frame of serially scanned data. The window generator receives a field of video data from an image data source. This video data consists of digitized frames of serially scanned data similar to a conventional television screen image, which is divided horizontally in pixels, and vertically in lines. The window generator permits any given frame to be subdivided into specific rectangular subregions, which may be located anywhere on the video picture.

By allowing statistics to be collected on the individual subregions (or "target areas") the window generator permits local processing of video data within the specified target areas, as opposed to processing of video data over the entire video field. One embodiment of the window generator is composed of: a microprocessor, a random access memory (RAM), a comparator, a line memory, two counters, an OR gate, a frame initialization circuit, and a buffer. These elements function as described below.

The microprocessor receives and forwards fields of video data from the image data source to the RAM in the form of serially scanned data frames. The microprocessor also generates commands to the RAM to divide up each frame into rectangular target areas. Each rectangular target area is defined by four points in the frame, by delineated pixel and line identification numbers. The video data field plus the data address of the target areas is forwarded from the RAM through the comparator and line memory to the video processing display circuit which displays the serially scanned data frames.

The comparator is used when there exists overlapping of two rectangular target areas. As mentioned above, the comparator receives both the field of video data and designated data addresses of the rectangular target areas from the RAM. When a specified locus within the video frame is within an overlap of two rectangular target areas, the comparator resolves this ambiguity by designating the intersection of the two areas as being part of the closest target number. The "closest target number" refers to the rectangular target area which is lowest in the frame as displayed by the video display.

The window generator permits users of the video display system to designate rectangular target regions in the manner described above. The window generator also automatically generates additional rectangular target regions when operation circumstances require it using: the two counters, the OR gate, the frame initialization circuit, and the buffer.

The first of the two counters is a delta counter, which receives what is known as a "delta field" from the RAM. This delta field includes the pixel ad line designations that define all rectangular target regions within the video frame. The function of the delta counter is to count pixel intervals between successive target area corners, and increment the memory address in the RAM to access new entries in the window memory.

The frame initialization circuit forwards a frame synchronization signal from the image data source to the memory address unit and the OR gate at the start of each new frame. The OR gate receives the output of both the delta counter and the frame initialization circuit, and produces therefrom its signal to the memory address unit.

The memory address unit is simply a counter which increments the memory addresses in the RAM to create new rectangular target area addresses when it receives signals from the OR gate. The process is as follows. The delta counter is basically counting the delta field at the pixel rate. When it receives a delta field from the RAM that indicates that the new target has been entered that has left all previously designated target areas, the delta counter forwards the new delta field through the OR gate and memory address unit back to the RAM to designate a new rectangular target area within the video frame. The buffer is used to conduct memory address signals from the memory address unit to the RAM.

It is an object of the present invention to divide frames of serially scanned data into subregions for localized image data processing.

It is another object of the present invention to allow users to designate specific target areas of interest in video frames.

It is another object of the present invention to automatically designate new rectangular target areas about newly acquired targets.

These objects, together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a window generator which receives, conducts, and processes serially scanned frames of video data from an image data source into frames of video data which may be subdivided into specific rectangular subregions and presented on a video display.

Figure 1:
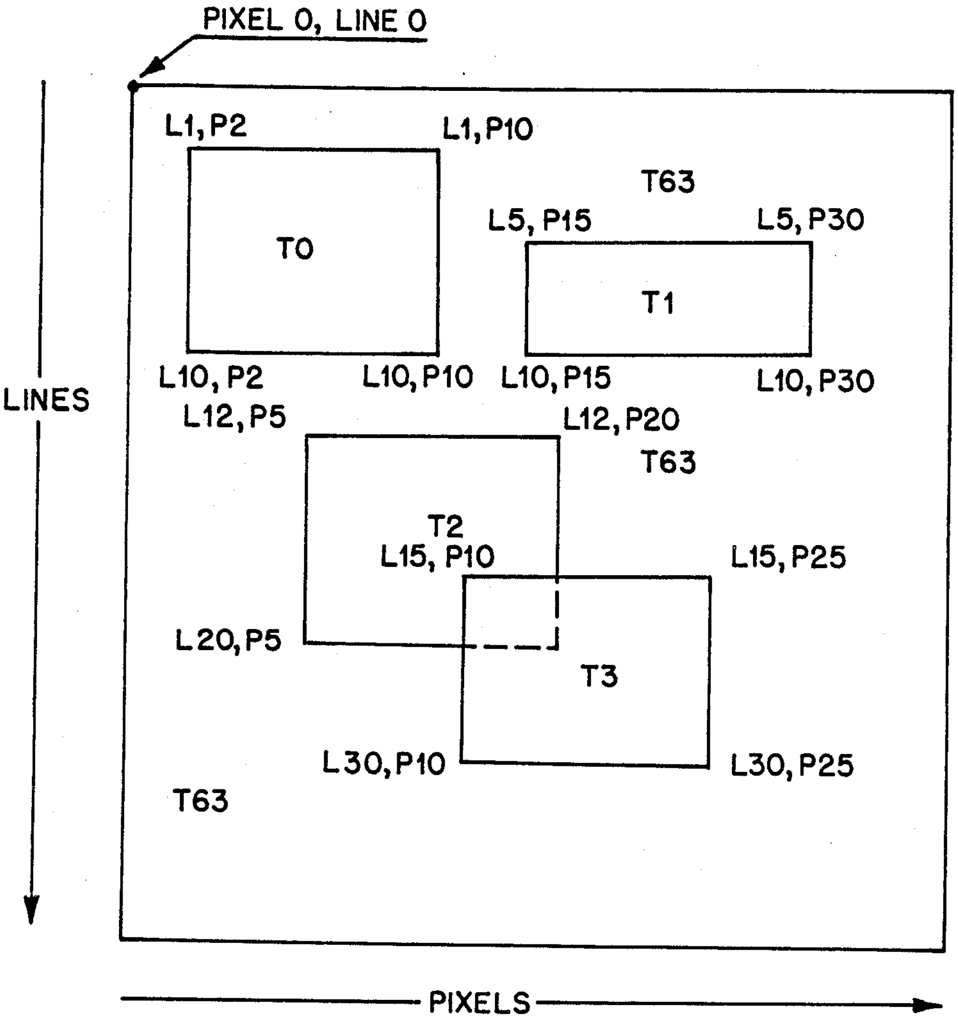
FIG. 1 is an illustration of a frame of serially scanned data after being processed by the present invention.

The reader's attention is now directed towards FIG. 1, which is an illustration of an example of a frame of serially scanned data, as it would appear on a video display after being processed by the window generator of the present invention. As mentioned above, the window generator designed provides a unique 6 bit target identification number for multiple target areas and one background area in a frame of serially scanned data. Any number of target areas can be identified by increasing memory width. The target areas are defined as rectangular sectors which are within a background which covers all other non-target locations.

The example in FIG. 1 shows target areas T0, T1, T2, T3 and background T63, with target areas T2 and T3 overlapping. By design the window generator will only output one target number in the overlap region (T3). T3 is chosen, in one embodiment, because it is lower in the frame than T2, indicating that it is closer in range.

Each rectangular target area, in the frame illustrated in FIG. 1, is defined by the identity of the location of the four corners of the rectangle. As illustrated in FIG. 1, a frame of reference is provided by defining the upper left hand corner of the frame as pixel 0, line 0. The lines are incrementally numbered as one proceeds down the frame; and the pixels are incrementally numbered as one proceeds to the right of the frame.

In the example of FIG. 1, target area T0 is defined by the location of its four corners: (L1, P2), (L1, P10), (L10, P2), and L10, P10). The target numbers allow video pipeline processing circuitry to collect statistics separately for each target area. A target number is provided for each pixel as the image is scanned in a raster scan format. The window generator is programmed by a general purpose computer prior to operation, as discussed below.

Figure 2:
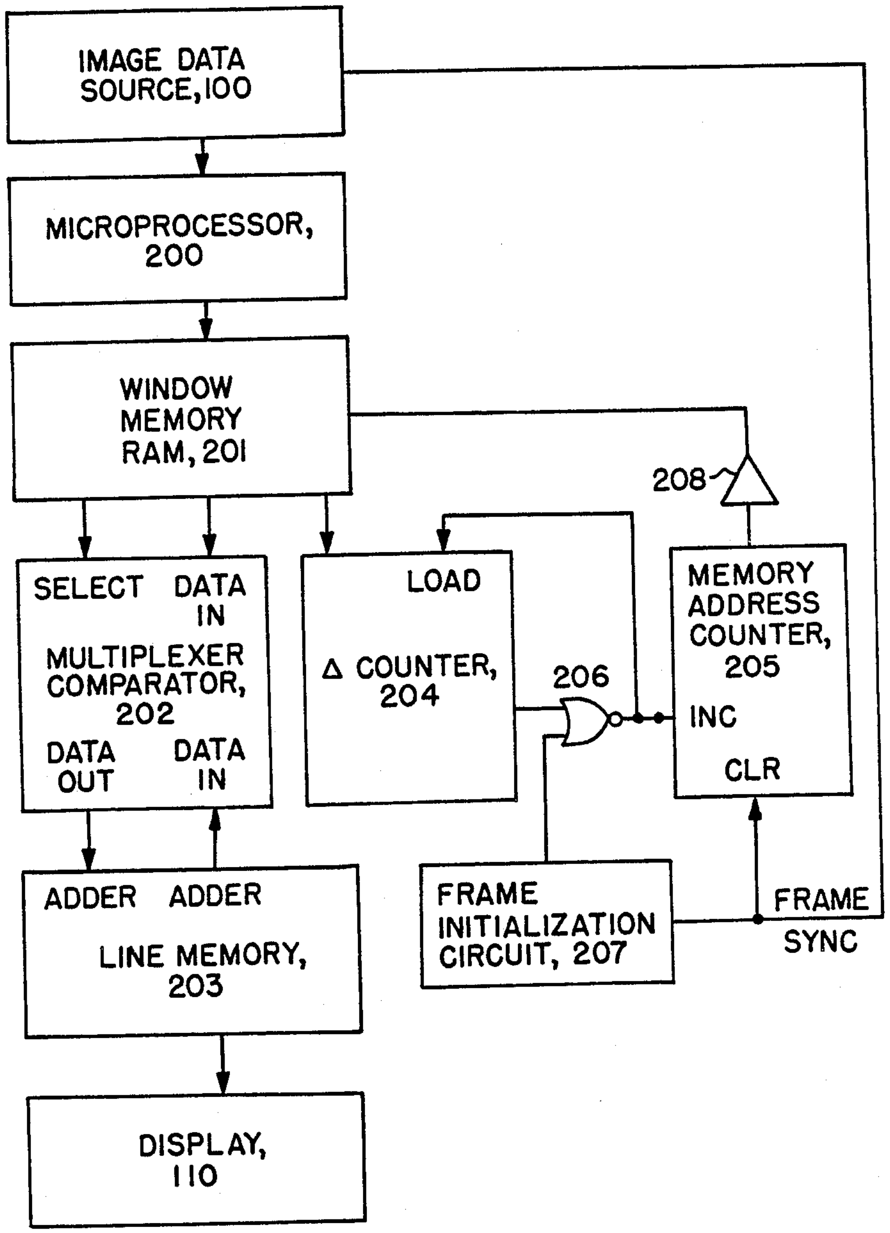
FIG. 2 is a block diagram of the window generator of the present invention.

To further understand the programming and operation of the window generator refer to the block diagram on FIG. 2. The window generator is composed of: a microprocessor 200, a random access memory (RAM) 201, a comparator 202, a line memory 203, two counters 204 and 205, an OR gate 206, a frame initialization circuit 207, and a buffer 208.

The microprocessor 200 receives and forwards fields of video data from the image data source 100 to the RAM 201 in the form of serially scanned data frames. The microprocessor 200 also generates commands to the RAM 201 to divide up each frame into rectangular target areas.

As mentioned above, each rectangular target area is defined by four points in the frame, by delineated pixel and line identification numbers. The window generator has contained, in RAM 201, the data necessary to define the window areas. This data is calculated and formatted off-line by a microprocessor 200 and downloaded into the RAM 201. Information contained in RAM 201 represents the number of pixels between any two successive target area corners along with a two bit command word. Three commands allow the microprocessor 200 to provide the necessary information about the target areas. These commands are:

n0—Write in a new target number to line memory;

n1—Recirculate previous line of target numbers; and n2—Conditionally end a target area by comparing target numbers of the previous line, with a designated target number. If numbers match, the RAM is commanded to write in a background target number. If no match exists, the RAM should recirculate the previous line of target numbers.

The purpose of the window memory RAM 200 is to store program information, target numbers, delta pixel numbers from target corner to corner, and a two bit program command. The video data field plus the data address of the target areas is forwarded through the comparator 202 and line memory 203 to the video processing display circuit 110, which displays the serially scanned data frames.

The comparator 202 is used when there exist overlapping rectangular target areas. As mentioned above, the comparator 202 receives the field of video data as well as designated data addresses of the rectangular target areas from the RAM 201. When a specified locus within the video frame is within an overlap of two rectangular target areas, the comparator 202 resolves this ambiguity by designating the intersection of the two areas as being part of the closest target number. For example, referring back to FIG. 1, the area of intersection between T2 and T3 would be designated as T3 , because it is lower in the frame, and closer in range than T2. To make this comparison, the comparator 202 compares the designated line identification numbers of the two intersecting rectangular target areas, and outputs the identity of the target area whose lowest corners have the highest line number.

The line memory 203 is a one line memory which stores the present line of target numbers and also provides the target numbers of the previous line. This line memory 203 allows the window generator to provide target numbers for all pixel locations without requiring a memory location for each pixel in the image. Note that the line memory 203 also forwards the video data field to the display 110.

The first of the two counters is the delta counter 204. The delta counter counts the pixel interval between successive target corners. When the delta counter detects that a pixel interval (between rectangular subregions which share common lines in a video frame) is not greater than zero, it increments a window memory address counter 205 which accesses the new entry from the window memory RAM 201.

For the example illustrated in FIG. 1, the computer would load a background target number T63 and a delta counter from line 0 pixel 0 (L0, P0) to (L1, P2) (the top left corner of T0) into the window memory as the first entry. The next corner occurs at the upper right hand corner of T0. The second entry would be target number T0 and a delta of 9 pixels. The next boundary change does not occur until the beginning of target T1. Since the target numbers on the following 4 lines do not change until T1 is encountered, the line data can be recirculated from (L1, P10) to (L5, P15) as the third entry. When the delta counter top counts at (L5, P15) the fourth window memory is read. The fourth entry is target T1 with a delta of 16 pixels.

Continuing with the example of FIG. 1, the computer would generate the following data to program the window memory RAM

| Entry | Select Code | Target Number | | Delta | |
|---|---|---|---|---|---|
| 0 | 0 write | 63 | (no target) | L0, P0 | L1, P2 |
| 1 | 0 write | T0 | | L1, P2 | L1, P10 |
| 2 | 1 recirculate | | — | L1, P10 | L5, P15 |
| 3 | 0 write | T1 | | L5, P15 | L5, P30 |
| 4 | 1 recirculate | | — | L5, P30 | L10, P2 |
| 5 | 3 end | T0 | | L10, P2 | L10, P10 |
| 6 | 0 recirculate | | — | L10, P10 | L10, P15 |
| 7 | 3 end | T1 | | L10, P10 | L10, P30 |
| 8 | 0 recirculate | | — | L10, P30 | L12, P5 |
| 9 | 1 write | T2 | | L12, P5 | L12, P20 |
| 10 | 0 recirculate | | — | L12, P20 | L15, P20 |
| 11 | 1 write | T3 | | L15, P20 | L15, P25 |
| 12 | 0 recirculate | | — | L15, P25 | L20, P5 |
| 13 | 3 end | T2 | | L20, P5 | L30, P10 |
| 14 | 3 end | T3 | | L30, P10 | T80 |

The window generator permits users of the video display system to designate rectangular target regions in the manner described above. The window generator also automatically generates additional rectangular target regions when operation circumstances require it using: the two counters, 204 and 205, the OR gate 206, the frame initialization circuit 207, and the buffer 208.

As mentioned above, the delta counter 204 receives what is known as a "delta field" from the RAM 201. This delta field includes the pixel and line designation that defines all rectangular target regions within the video frame. The function of the delta counter 204 is to count pixel intervals between successive target area corners, and increment the memory address in the RAM 201 to access new entries in the window memory.

The frame initialization circuit 207 forwards a frame synchronization signal from the image data source to the memory address unit 205 and the OR gate 206 at the start of each new frame. The frame initialization circuit is conventional in the art and is contained in most video systems. The OR gate 206 receives the output of both the delta counter 204 and the frame initialization circuit 207 and produces therefrom its signal to the memory address unit 205.

The memory address unit 208 is simply a counter which increments the memory addresses in the RAM 201 to create new rectangular target area addresses when it receives signals from the OR gate 206. The process is as follows. The delta counter 204 is basically counting the delta field at the pixel rate. When it receives a delta field from the RAM 201 that indicates that the new target has been entered that has left all previously designated target areas, or that an overlap exists between two target areas, the delta counter forwards the new delta field through the OR gate 206 and memory address unit 205 back to the RAM 201 to designate a new rectangular target area within the video frame. The buffer 208 is used to conduct memory address signals from the memory address unit to the RAM 201.

Figure 3:
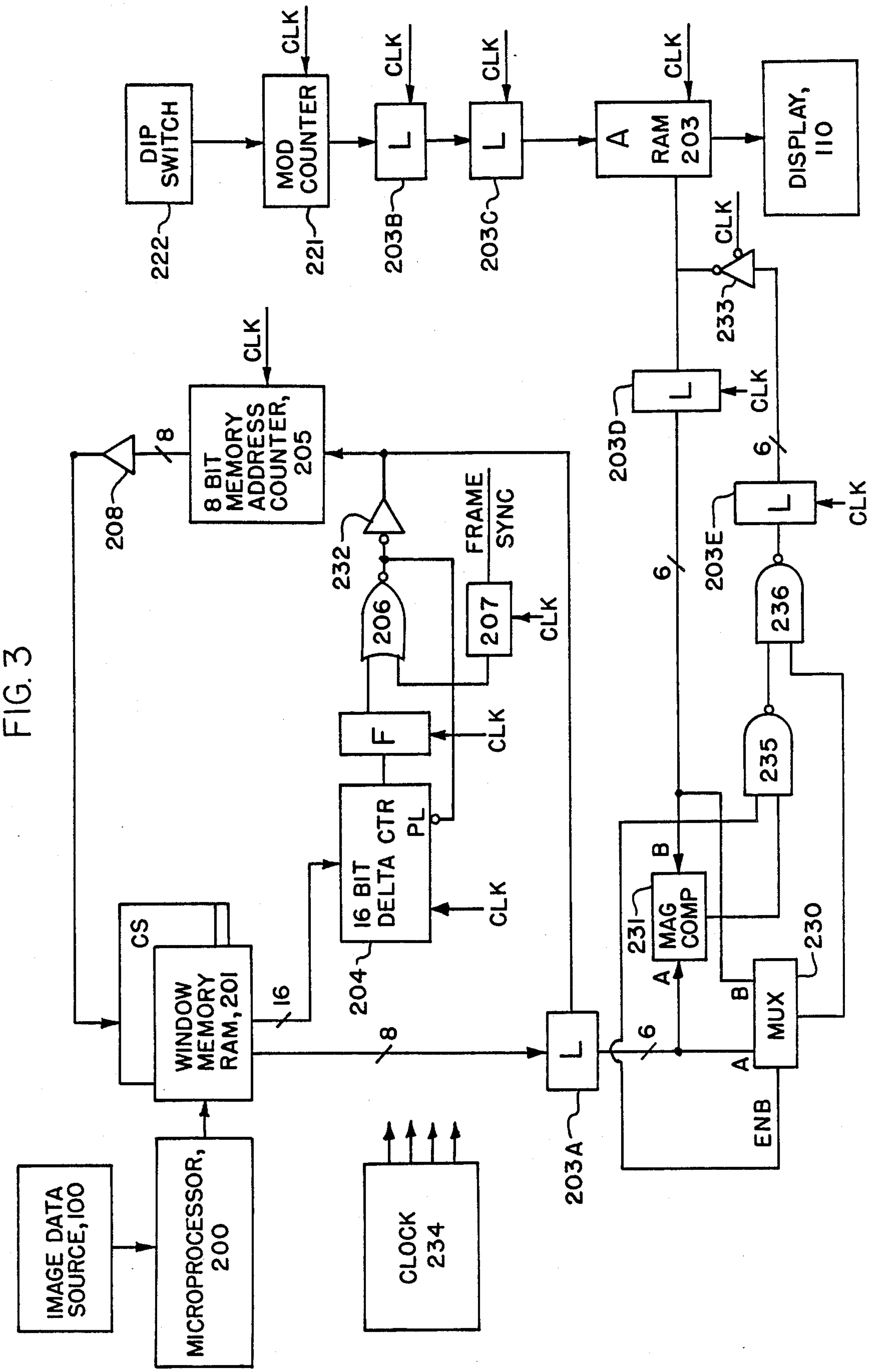
FIG. 3 is an electrical schematic of the window generator of FIG. 2.

An electrical schematic of the window generator hardware is shown in FIG. 3. The window memory 201 is a 256×24 bit RAM that is loaded under CPU control. Eight address bits specify one of 256 RAM entries while the 24 bit data is entered in two parts using the ram chip selects. Sixteen bits of the ram output feed the delta counter 204. This counter 204 counts the pixel interval between target boundaries. It is initially loaded to the delta count stored at address zero, by a load pulse generated at the beginning of the frame. At this time, the memory address counter is cleared to zero. The target number and select code are then loaded into a latch by the load pulse. The memory address counter 205 is incremented and the next location is accessed. Data from this new location will not be used until the delta counter 204 counts out and another load pulse is generated.

The select code bits B6 and B7 specify the type of line memory operation to be executed, either: write new ID (00)B, recirculate previous line (01)B, or conditional end target area (11)B. These select code bits thereby indicate the nature of the commands to be executed. The "no" command directs one to "write a new target number". The "n1" command is a "recirculate" command. These commands are discussed further below.

When conditionally ending a target area, a magnitude comparator 219 compares the specified target number in the window memory 201 with the target numbers from the line memory 203D. If the target numbers do not match, the line is recirculated. If there is a match then a boundary area (T63) is written into the line memory 203E.

The line memory 203A on the left hand side of FIG. 3 operates as a shift register which stores and circulates a line of target numbers.

The line memory "shift register" is implemented by using a RAM 220 and a modulo counter 221. The amount of delay is determined by this modulo counter 221. New target numbers are written into the RAM 220 at some address N, and read out of the RAM 220 at the next address time N which occurs one line minus one pixel clock periods later. Data out of the RAM 220 is latched by the clock (CLK) and feeds the window memory target number comparator and data selector.

The last delay is provided by the existing latch which provides the new target I.D. which will be written into memory. Read cycles take place first and occur on the high portion of CLK followed by a write cycle on the low portion of the CLK.

The window generator may be easily expanded by adding additional capacity to the window memory. For each target rectangle desired, 4 memory locations, each 24 bits wide, must be included.

Figure 4:
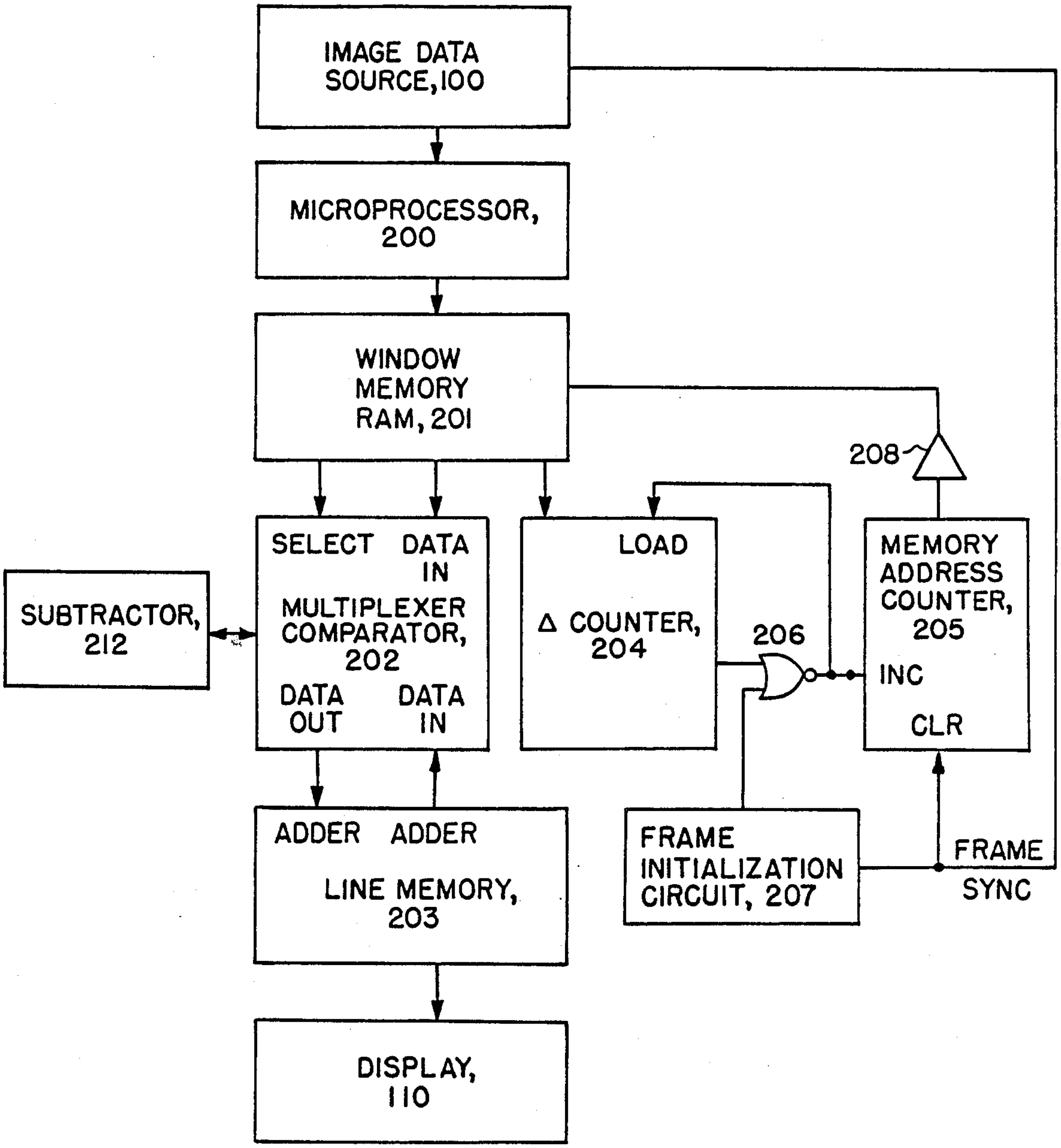
FIG. 4 is another embodiment of the present invention.

In an effort to reduce the time needed to perform data transfers between a general purpose computer and the window memory RAM 201 of the window generator, a modification may be incorporated into the window generator. The modified window generator is illustrated in FIG. 4 and allows the computer to write the vertical size of the window into the window memory RAM 201 in the same address space as the horizontal window size (Δfield), whereas the original window generator required that the vertical size be programmed separately. This feature reduces the number of input-/output (I/O) transfers per window from 4 to 2, thus cutting overhead time. The VERT SIZE FIELD is stored into the line memory 203 during a n0 command along with the new target number. One line later, when the VERT SIZE is recalled from the line memory 203, the VERT SIZE will be decremented by 1 and rewritten into the line memory 203. This decrementation process will continue until the sign from the subtractor 212 goes negative, at which time the current target number will be erased from the line memory 203 and the background ID will take its place. Thus, the sign of the subtractor 212 controls the erase and as such, the n2 command is unneeded, making the CMD FIELD 1 bit wide (the command is either a write new target number, n0, or a recirculate, n1). As before, if windows overlap, the lower will have priority in the modified window generator.

It should be noted that although the modified window generator has faster programming capabilities, it requires more hardware than the original window generator. A wider line memory 203, wider window memory 201 and subtractor 212 should be incorporated into the modified window generator While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A window generator which receives a field of video data from an image data source and which provides rectangular subregions which may be located anywhere in a video frame of said field of video data when it is displayed on a video display, said window generator conducting said field of video data with said rectangular subregions imposed thereon to said video display, said window generator comprising:

a microprocessor which receives said field of video data from said image data source and which outputs said field of video data along with command signals which initiate said rectangular subregions;

a window memory which receives said field of video data and said command signals from said microprocessor, said window memory containing data necessary to define each of said rectangular subregions in terms of four corners, each of said corners being specified by a pixel identification number and a line identification number which indicates a precise location of each corner, and therefrom, each rectangular subregion as it appears in a frame displayed by said video display, said window memory outputting said field of video data and said rectangular subregions so that they may be forwarded to said video display;

a multiplexer means which receives, combines and outputs said field of video data with said rectangular subregions from said window memory to produce output signals; and a line memory which receives and conducts said output signals from said multiplexer means to said video display, said line memory also receiving and storing said data defining each of said rectangular subregions.

2. A window generator, as defined in claim 1, wherein said line memory outputs said data defining each of said rectangular subregions, and wherein said multiplexer means includes a comparator which receives and compares said data defining said rectangular subregions from said line memory with data defining rectangular subregions from said window memory, said comparator designating an overlapping area between a first and second overlapping rectangular subregion as belonging uniquely to the first overlapping subregion when the first overlapping subregion has a line identification number which places its lowest corners at an area lower on said video frame on said display than any of said second overlapping rectangular subregion, said comparator designating said overlapping area as belonging to said second overlapping rectangular subregion otherwise, said comparator thereby resolving ambiguity in designating an identity for said overlapping area between the first and second overlapping rectangular subregions.

3. A window generator, as defined in claim 2, wherein said window memory has a memory address which contains said data defining said rectangular subregions, and said window memory outputs a delta field which includes pixel and line designations that define all of said rectangular subregions in said video frame, and said window generator includes a means for automatically generating additional rectangular subregions within said video frame, said generating means receiving said delta field from said window memory and generating additional rectangular subregions by incrementing the memory address in said window memory when new entries in said field of video data transcend the existing rectangular subregions used by the window generator.

4. A window generator, as defined in claim 3, wherein said means for automatically generating additional rectangular subregions comprises:

a delta counter which receives said delta field from said window memory and counts pixel intervals between said rectangular subregions, said delta counter producing an output signal to automatically access a new entry in the window memory when a pixel interval between subregions which share common lines in the video frame is not greater than zero, said delta counter thereby allowing the window generator to correct overlap between the rectangular subregions;

a frame initialization circuit which forwards a frame synchronization command when said field of video data from said data source comprises a plurality of digitized frame of serially scanned data and a start of a new frame is detected, an OR gate which produces an output signal when receiving said synchronization command from the frame initialization circuit, said OR gate also producing an output signal when receiving the output signal from the delta counter;

a memory address counter which receives and counts the output signal from the OR gate to designate a new rectangular target area by forwarding a new delta field which equals the counts of the output signal of the OR gate., and a buffer which receives and conducts the new delta field from the memory address counter to the memory address of the window memory.

5. A window generator as defined in claim 4 wherein said multiplexer means includes a subtractor which receives and decrements a line count in the data which defines a rectangular subregion from the line memory, said subtractor outputting to the window memory a new rectangular subregion with a reduced vertical size, said subtractor thereby allowing users of the window generator to vertically adjust a rectangular subregion by reducing its vertical size in the video frame.

* * * * *